(12) United States Patent
Magnuson et al.

(10) Patent No.: US 11,248,424 B2
(45) Date of Patent: Feb. 15, 2022

(54) APPARATUS AND METHOD FOR SECURING TUBULARS ON A DRILLING RIG

(71) Applicant: Nabors Drilling Technologies USA, Inc., Houston, TX (US)

(72) Inventors: Christopher Magnuson, Houston, TX (US); Alex Kunec, Tomball, TX (US); Eric Deutsch, Houston, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 0 days.

(21) Appl. No.: 17/090,187

(22) Filed: Nov. 5, 2020

(65) Prior Publication Data

US 2021/0054699 A1 Feb. 25, 2021

Related U.S. Application Data

(62) Division of application No. 16/440,479, filed on Jun. 13, 2019, now Pat. No. 10,837,242.

(60) Provisional application No. 62/692,158, filed on Jun. 29, 2018.

(51) Int. Cl.
*E21B 19/14* (2006.01)
*F16L 3/227* (2006.01)
*B65G 1/04* (2006.01)
*A47F 7/02* (2006.01)

(52) U.S. Cl.
CPC .............. *E21B 19/14* (2013.01); *A47F 7/021* (2013.01); *B65G 1/0442* (2013.01); *F16L 3/227* (2013.01)

(58) Field of Classification Search
CPC .......... E21B 19/14; E21B 19/00; E21B 19/15; E21B 19/155; E21B 19/143; A47F 7/0021; A47F 7/0028; B65G 1/0442; F16L 3/227; F16L 3/22; F16L 3/221; F16L 3/222; F16L 3/223; F16L 1/207; F16L 3/2235; E05B 73/02; A47B 81/005
USPC ........... 211/70.4, 4; 414/22.63, 22.61, 22.68, 414/22.71; 175/52
See application file for complete search history.

(56) References Cited

U.S. PATENT DOCUMENTS

| | | |
|---|---|---|
| 1,634,859 A | 7/1927 | Tibbetts |
| 1,718,395 A | 6/1929 | Webb et al. |
| 1,804,962 A | 5/1931 | Thorpe |
| 1,887,901 A | 5/1932 | Dodson |
| 1,947,553 A | 2/1934 | Johnston |
| 2,161,719 A | 6/1937 | Minyard et al. |
| 2,094,506 A | 9/1937 | Umphres |

(Continued)

FOREIGN PATENT DOCUMENTS

CN 203867494 U 10/2014

*Primary Examiner* — Jennifer E. Novosad
(74) *Attorney, Agent, or Firm* — Abel Schillinger, LLP; Enrique Abarca

(57) ABSTRACT

A device and method for subterranean operations comprising a latch adapted to be coupled with a fingerboard of a drilling rig, the fingerboard including at least two fingers, wherein: the latch is selectively moveable between an open configuration and a closed configuration, the latch is adapted to selectively permit entrance of a first tubular into a tubular storage area between the at least two fingers when the latch is in the open configuration, and selectively maintain the first tubular in the tubular storage area when the latch is in the closed configuration, and the latch is spaced apart from the fingerboard.

20 Claims, 5 Drawing Sheets

(56) References Cited

U.S. PATENT DOCUMENTS

| | | |
|---|---|---|
| 2,102,966 A | 12/1937 | Nash |
| 2,148,058 A | 2/1939 | Clark |
| 2,235,265 A | 3/1941 | Shope |
| 2,289,217 A | 7/1942 | Shope |
| 2,311,932 A | 2/1943 | Deckard |
| 2,311,933 A | 2/1943 | Deckard |
| 2,326,052 A | 8/1943 | Moore |
| 2,413,297 A | 12/1946 | Deckert |
| 2,507,040 A | 5/1950 | Moore |
| 2,619,234 A | 11/1952 | Stone |
| 2,738,076 A | 5/1956 | Porter |
| 2,773,605 A | 12/1956 | De Jarnett |
| 3,193,084 A | 7/1965 | Bauer et al. |
| 3,501,017 A | 3/1970 | Johnson et al. |
| 3,561,811 A | 2/1971 | Turner, Jr. |
| 3,592,347 A | 7/1971 | Kelly et al. |
| 3,612,286 A | 10/1971 | Langowski et al. |
| 3,615,027 A | 10/1971 | Ham |
| 3,616,941 A | 11/1971 | Walling |
| 3,768,663 A | 10/1973 | Turner, Jr. et al. |
| 3,799,364 A | 3/1974 | Kelly et al. |
| 3,870,165 A | 3/1975 | Besijn |
| 4,632,618 A | 12/1986 | Issakainen |
| 4,725,179 A | 2/1988 | Woolslayer et al. |
| 6,089,333 A | 7/2000 | Rise |
| 6,976,540 B2 | 12/2005 | Berry |
| 7,083,007 B2 | 8/2006 | Herst |
| 7,510,028 B2 | 3/2009 | Welsh |
| 7,699,122 B2 | 4/2010 | Eriksen |
| 8,961,093 B2 | 2/2015 | Springett et al. |
| 9,016,382 B2 | 4/2015 | Braxton |
| 9,206,656 B2 | 12/2015 | Roodenburg et al. |
| 10,132,660 B2 | 11/2018 | Newton et al. |
| 10,246,952 B2 | 4/2019 | Trydal et al. |
| 10,280,002 B2 | 5/2019 | Giachero |
| 10,837,242 B2 * | 11/2020 | Magnuson .............. F16L 3/227 |
| 2005/0092524 A1 | 5/2005 | Herst |
| 2009/0053015 A1 | 2/2009 | Zachariasen et al. |
| 2010/0303586 A1 | 12/2010 | Hankins et al. |
| 2011/0005162 A1 | 1/2011 | Roodenburg et al. |
| 2012/0175326 A1 | 7/2012 | Lunde |
| 2013/0032405 A1 | 2/2013 | Braxton |
| 2014/0202769 A1 | 7/2014 | Magnuson |
| 2015/0048038 A1 | 2/2015 | Roodenburg et al. |
| 2016/0076920 A1 | 3/2016 | Newton et al. |
| 2017/0306710 A1 | 10/2017 | Trydal et al. |
| 2018/0002994 A1 | 1/2018 | Albanese |
| 2018/0087332 A1 | 3/2018 | Berry et al. |
| 2019/0119995 A1 | 4/2019 | Gullaksen et al. |
| 2019/0153791 A1 | 5/2019 | Slettedal |
| 2019/0226287 A1 | 7/2019 | Trydal et al. |
| 2020/0003017 A1 | 1/2020 | Magnuson et al. |

* cited by examiner

APPARATUS AND METHOD FOR SECURING TUBULARS ON A DRILLING RIG

CROSS-REFERENCE TO RELATED APPLICATION

This application is a divisional of and claims priority to U.S. patent application Ser. No. 16/440,479, filed on Jun. 13, 2019 by Christopher MAGNUSON et al., and entitled "APPARATUS AND METHOD FOR SECURING TUBULARS ON A DRILLING RIG," which claims priority under 35 U.S.C. § 119(e) to U.S. Provisional Patent Application No. 62/692,158 entitled "An Apparatus And Method For Securing Tubulars On A Drilling Rig," by Christopher Magnuson, Alex Kunec and Eric Deutsch, filed Jun. 29, 2018, of which both applications are assigned to the current assignee hereof and incorporated herein by reference in their entireties.

FIELD OF THE DISCLOSURE

The present disclosure relates generally to securely storing tubulars on drilling rigs, and more particularly to apparatuses and methods for securely storing tubulars on drilling rigs.

RELATED ART

Drilling subterranean wells for oil and gas generally includes the use of a drilling rig coupled with a drill string comprised of a plurality of interconnected tubular segments. Segment of tubular typically include generally annular sidewalls defining a central aperture. Due to their hollow construction, tubular segments are often subject to flexure and bending.

During drilling, segments of tubular are assembled on the drilling rig. Sometimes segments are applied individually to the drill string. Other times, a number of segments are presecured together to form tubular stands prior to attachment to the drill string. For example, it is common to attach two or more tubular segments together to form a tubular stand and then attach the tubular stand to the drill string.

Tubular segments, and stands, by their nature and size can be very dangerous to workers on the drilling rig. Instances of stands falling over and damaging sections of the drill rig are not uncommon. This is particularly dangerous when tripping for the bottomhole assembly, where dozens of stands may be removed from the wellbore and stored on the drilling rig for later use. The oil and gas industry continues to demand improvements in methods and apparatuses for securing tubular segments on the drilling rig to prevent equipment damage or loss of life.

BRIEF DESCRIPTION OF THE DRAWINGS

Embodiments are illustrated by way of example and are not limited in the accompanying figures.

DETAILED DESCRIPTION

Figure 1:
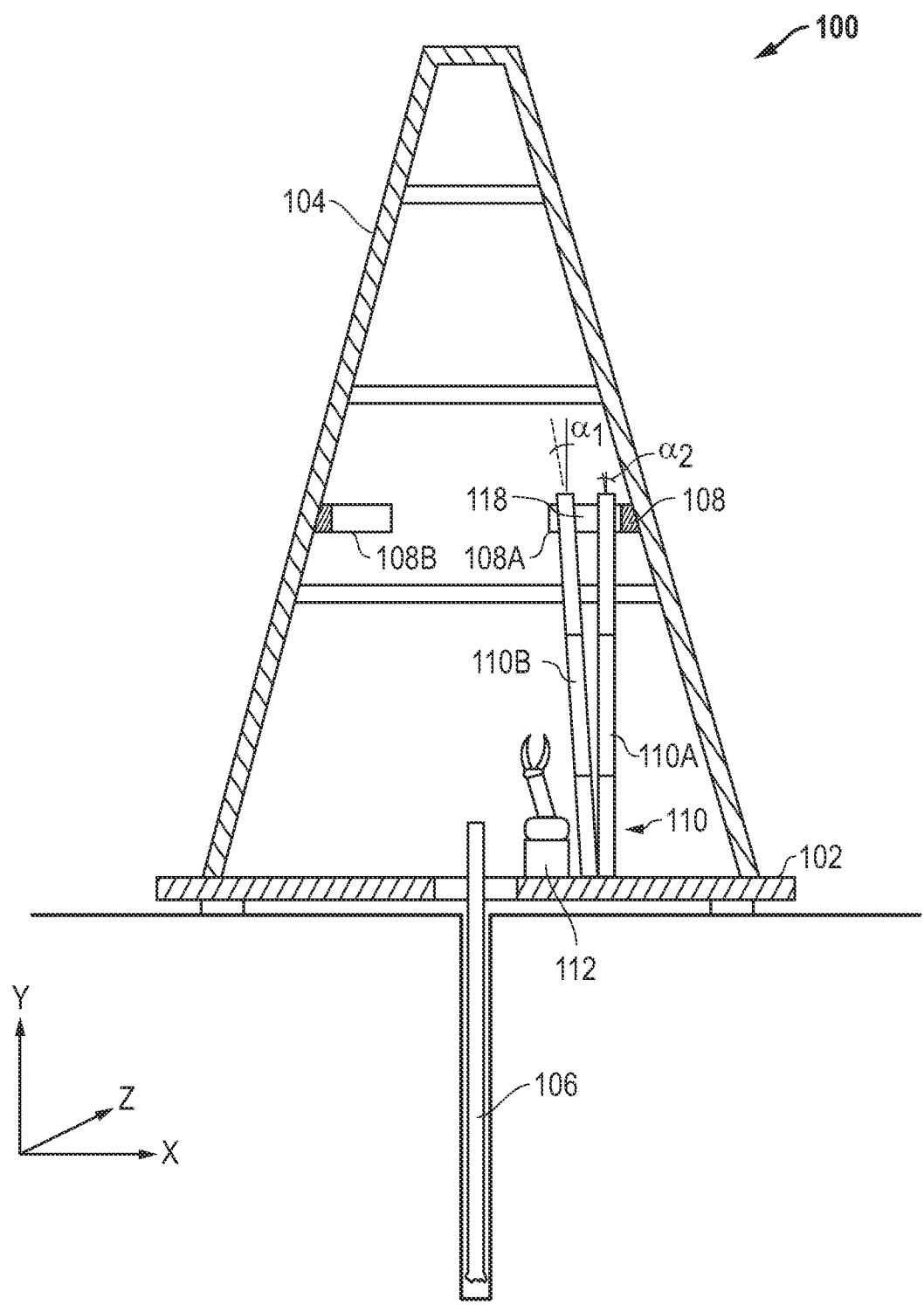
FIG. 1 includes a cross-sectional schematic view of a drilling rig in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, "generally equal," "generally same," and the like refer to deviations of no greater than 10%, or no greater than 8%, or no greater than 6%, or no greater than 4%, or no greater than 2% of a chosen value. For more than two values, the deviation can be measured with respect to a central value. For example, "generally equal" refer to two or more conditions that are no greater than 10% different in value. Demonstratively, angles offset from one another by 98% are generally perpendicular. As used herein, "vertical elevation" is generally described with respect to a Y-axis of an X-, Y-, Z-field. In particular embodiments, the Y-axis may correspond with a surface axis of a drill string to be operated on. In certain instances, the Y-axis may be normal to a level ground surface.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the drilling arts.

Generally, subterranean drilling operations utilize a drill string constructed from thin-walled drill tubular segments successively coupled together. Tubular segments are typically connected together by threaded interfaces at longitudinal ends thereof. After coupling segments together, the drill string is rotated and advanced into the wellbore. As drilling continues, additional tubular segments are required to maintain a surface connection between the drill string and the drilling rig. These tubular segments are coupled together at the surface.

To reduce drilling down time, it is possible to couple together at least two tubular segments to form a tubular stand. Tubular stands can be formed independent of the drill string. Typically, stand building is done three tubular segments at a time. By forming tubular stands at the surface while drilling, the operator can save the time required to connect the tubular segments together individually to the drill string, thus increasing drilling efficiency.

Secure storage of tubular stands on the drilling rig is thus vital as tripping operations can result in dozens of tubular stands, each in excess of 90 feet, requiring surface storage. Moreover, to conserve space on the drilling rig floor, the tubular stands are typically stored in the vertical orientation, with their longitudinal axis generally parallel with a Y-axis of an X-, Y-, Z-field. While this may increase carrying capacity of the drilling rig, the introduction of heavy, often wobbly tubular stands can be dangerous to equipment on the drilling rig and to any operators on or near the drilling rig.

An apparatus, such as a fingerboard, can be utilized to maintain the tubular stands in a generally fixed position and mitigate danger to operators and equipment below. Fingerboards are typically positioned in the mast or upper portions of the drilling rig. Fingerboards typically include a base area from which fingers project outwardly. Spaces between the fingers can be referred to as tubular storage areas. Tubular segments, e.g., tubular stands, can be introduced into the tubular storage areas to reduce occurrence of tipping or falling over.

However, support from the fingers alone is not always sufficient to prevent the tubulars from falling. For example, in offshore drilling operations, drilling rigs are frequently subjected to waves which rock and sway the drilling rig. High winds, flying debris, subterranean tremors or shocks, blowouts, and rig floor accidents can also rock or sway the drilling rig, causing the tubular stands to rock and sway within the fingerboard. If the rocking and swaying is significant enough, one or more of the tubular stand can fall from the fingerboard. In particular, the tubulars can fall through the openings of the tubular storage areas located at the end of the fingers. The damage from falling tubular stands can be catastrophic and dangerous to operators on the drilling rig.

Embodiments of the present disclosure present devices and methods of securing tubulars on a drilling rig. In a particular embodiment, a device for securing tubulars can include a latch system adapted to be coupled with a rack, e.g., a fingerboard, of a drilling rig. The latch system, or at least a portion thereof, can be selectively moveable between an open configuration and closed configuration. In the open configuration, the latch system can selectively permit entrance of a tubular into the tubular storage area. In the closed configuration, the latch system can selectively maintain the tubular in the tubular storage area. In certain embodiments, the latch system can be adapted to generate a biasing or securing force against tubular(s) disposed in the tubular storage area. In other embodiments, the latch system can be used to index a number or location of tubulars within the fingerboard.

In an embodiment, the tubular storage area is adapted to receive a number of tubulars greater than a number of latch systems (or levers of a single latch system) in the tubular storage area. For example, the tubular storage area can be adapted to receive at least 5 tubulars and the latch system can include 4 or less levers adapted to selectively secure tubulars within the tubular storage area. In a more particular embodiment, the tubular storage area can be adapted to receive a plurality of tubulars and the latch system can include only one lever.

In certain embodiments, the fingerboard can define a plurality of tubular storage areas disposed, for example, between adjacent fingers thereof. In an embodiment, each tubular storage area can be adapted to receive more tubulars than the number of latch systems (or levers) adapted to selectively secure tubulars within the tubular storage areas.

In an embodiment, the latch system, or a portion thereof, can be spaced apart from the fingerboard. For example, in an embodiment, the latch is disposed at a vertical elevation below the fingerboard. In a particular embodiment, the latch system includes a lever spaced apart from the body of the fingerboard. In an embodiment, the lever is entirely spaced apart from the fingerboard. In a further embodiment, the lever does not contact the fingerboard during any portion of the latch system's operation.

In certain embodiments, a latch system can be adapted to be retrofit to an existing rack, such as an existing fingerboard. The latch system can include, for example, an elongated member adapted to be coupled to an existing fingerboard. A rotatable lever can be rotatably and translatably coupled to the elongated member and adapted to selectively maintain tubulars in a tubular storage area of the fingerboard.

A method for securing tubulars on a drilling string can include positioning a first tubular in a tubular storage area of a rack. The tubular storage area can include an opening into which the first tubular can be inserted to enter the tubular storage area. The latch system can be moved from an open configuration to a closed configuration to selectively prevent the first tubular from leaving the tubular storage area. The lever can then be translated in a direction away from the opening of the tubular storage area toward the first tubular. The lever can contact the first tubular and maintain a biasing pressure against the first tubular. While such biasing pressure is not required, it can preload the system to prevent tipping or tubular movement during high sway conditions (e.g., high winds or high waves). In an embodiment, the method can further include indexing a number of tubulars within the tubular storage area. In a particular embodiment, indexing can be performed using an automated system including an encoder, a sensor, a microprocessor, a motor, or any combination thereof.

Referring to FIG. 1, a drilling rig 100 can generally include a drilling rig floor 102, a mast 104 (or other structure) extending vertically from the floor 102, and a drive element (not illustrated) suspended from the mast 104 and adapted to drive a drill string 106 into a wellbore below the drilling rig 100. This disclosure is not intended to be limited to drilling rigs 100 with suspended drive elements such as top drives or drilling rigs 100 without traditional masts. In certain embodiments, the drive element can include a rotary table and kelly or another suitable drive element. The drilling rig 100 can be land-based or water-based.

In the illustrated embodiment, the mast 104 extends a distance above the floor 102. A rack, such as fingerboard 108, can be attached above the floor 102. In an embodiment, the fingerboard 108 can be attached to the mast 104. The fingerboard 108 can be offset or laterally spaced apart from the drill string 106 to permit stand building and storage simultaneous with drilling operations. A secondary rack (not illustrated) may be disposed in vertical alignment with the fingerboard 108 to secure an opposite end of tubulars 100 and prevent sliding. In a particular embodiment, the secondary rack is disposed adjacent to the floor 102.

In an embodiment, the fingerboard 108 can be generally planar. In a more particular embodiment, the fingerboard 108 can generally lie along the X-Z plane. In an embodiment, the fingerboard 108 can be fixedly coupled with the mast 104 (or other suitable structure). In another embodiment, the fingerboard 108 can be removably coupled with the mast 104 (or other suitable structure).

Tubulars 110 can extend between the floor 102 and the fingerboard 108 in a generally vertical orientation. In a more particular embodiment, tubulars 110 can be coupled with, such as at least partially secured relative to, the fingerboard 108. In the illustrated embodiment the drilling rig 100 includes two fingerboards 108a and 108b. In another embodiment, the drilling rig 100 can include one fingerboard 108. In yet a further embodiment, the drilling rig 100 can include three or more fingerboards 108.

In an embodiment, a secondary rack (not illustrated) can be disposed in a same lateral plane as the fingerboard 108 and adapted to support the tubulars 110 at a second location. In a particular embodiment, the secondary rack is disposed at a different vertical elevation as compared to the fingerboard 108. For example, the secondary rack can be disposed below the fingerboard 108. In a particular embodiment, the secondary rack can be disposed adjacent to or near the floor 102 of the drilling rig 100. In certain instances, the secondary rack can contact the tubulars 110 at a secondary longitudinal location spaced apart from the fingerboard 108. Between the fingerboard 108 and secondary rack, the tubulars 110 can be contacted in at least two locations, further reducing the chance of tubulars 110 slipping or falling. The secondary rack can include receiving areas adapted to receive the tubulars 110. In an embodiment, the receiving areas of the secondary rack can be substantially the same as the fingerboard 108. In another embodiment, the receiving areas of the secondary rack can be different than the fingerboard 108.

A tubular handling device 112 can selectively couple with the tubulars 110 and introduce the tubulars 110 into a tubular storage area 118 of the fingerboard 108. In a more particular embodiment, a gripper of the tubular handling device 112 can couple with and engage the tubulars 110. In an embodiment, the tubular handling device 112 can introduce the tubulars 110 into the fingerboard 108 at a first angle, $\alpha_1$, corresponding with an angular offset of the tubular 110 from the Y-axis. In an embodiment, $\alpha_1$ can be at least 1°, at least 5°, or a least 10°. In another embodiment, $\alpha_1$ can be no greater than 30°, no greater than 15°, or no greater than 11°. A latch system 120 (described in greater detail with respect to FIG. 2) can reorient the tubular from the first angle, $\alpha_1$, to a second angle, $\alpha_2$, different than the first angle, $\alpha_1$. In an embodiment $\alpha_1$ and $\alpha_2$ are angularly offset from one another by at least 1°, at least 2°, at least 3°, at least 4°, at least 5°, or at least 10°. In another embodiment, $\alpha_1$ and $\alpha_2$ are angularly offset from one another by no greater than 45°, no greater than 30°, no greater than 20°, or no greater than 15°. In an embodiment $\alpha_2$ is angularly offset from the Y-axis by a smaller angle than $\alpha_1$. In a more particular embodiment, $\alpha_2$ is less than 10°, less than 8°, less than 6°, less than 4°, less than 2°, or less than 1°. In yet a more particular embodiment, $\alpha_2$ is parallel with the Y-axis.

In an embodiment, the tubular handling device 112 can introduce the tubulars 110 into the fingerboard 108 such that lower ends of the tubulars 110 are positioned at a final storage location (e.g., next to an adjacent tubular 110). The latch system 120 (FIG. 2) can reorient the tubulars 110 such that the upper ends of the tubulars 110 are substantially aligned with the lower ends.

Figure 2:
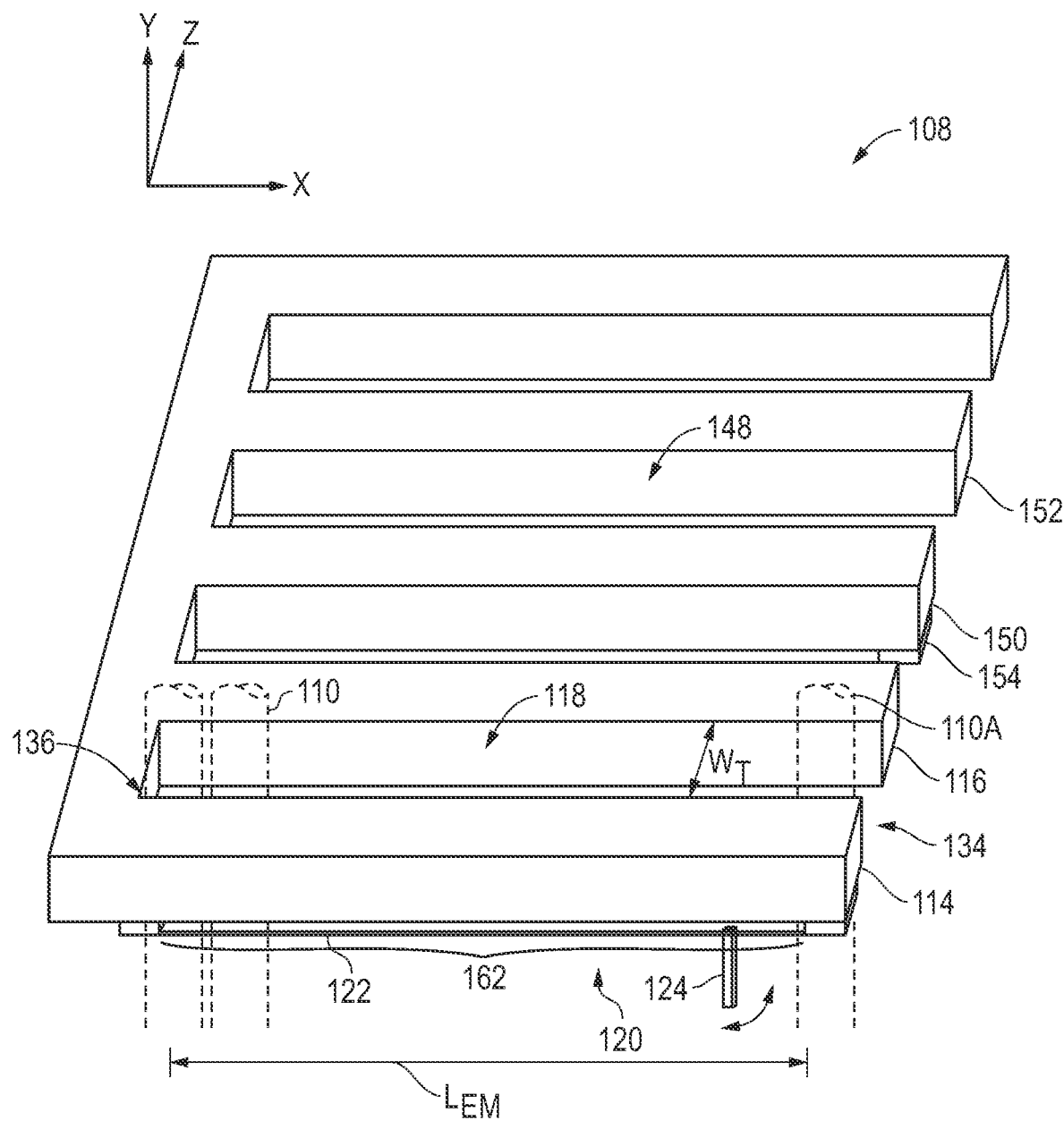
FIG. 2 includes a perspective view of a fingerboard and latch system in accordance with an embodiment.

Referring to FIG. 2, the fingerboard 108 can include a first finger 114 and a second finger 116 defining a tubular storage area 118 adapted to receive one or more tubulars 110. The first and second fingers 114 and 116 can be coupled together through an intermediary element of the fingerboard 108 such as a base from which a plurality of fingers project from. An opening 134 of the tubular storage area 118 can permit entrance of tubulars 110 into the tubular storage area 118. In a particular embodiment, the tubular storage area 118 has a width, $W_T$, as measured perpendicular to a length of at least one of the first and second fingers 114 and 116, less than 200% the diameter of the tubular 110 to be received in the tubular storage area 118, less than 150% the diameter of the tubular 110 to be received in the tubular storage area 118, or less than 125% the diameter of the tubular 110 to be received in the tubular storage area 118. In an embodiment, the first and second fingers 114 and 116 are coupled together. In a particular instance, the first and second fingers 114 and 116 are statically coupled together such that they cannot move with respect to one another. For example, the first and second fingers 114 and 116 can be fixed together such that they cannot pivot, rotate, translate, or otherwise move with respect to one another.

The tubular storage area 118 can be adapted to receive at least 1 tubular 110, at least 5 tubulars 110, or at least 10 tubulars 110. In an embodiment, the tubular storage area 118 can be adapted to receive no greater than 100 tubulars 110, no greater than 50 tubulars 110, or no greater than 20 tubulars 110. The number of tubulars 110 receivable in the tubular storage area 118 can be in a range between and including any of the values given above. For example, the tubular storage area 118 can be adapted to receive between 2 and 100 tubulars 110, or between 5 and 15 tubulars 110.

During certain drilling operations such as tripping for the bottom hole assembly (BHA), a first tubular 110A (or a first tubular stand) can be positioned in the tubular storage area 118, for example, by one or more tubular handling devices 112 (FIG. 1). The tubular handling device 112 can position the first tubular 110A at least partially within the tubular storage area 118 or at an area adjacent to the opening 134. The latch system 120 can be adapted to selectively permit entrance of tubulars 110 into the tubular storage area 118. The latch system 120 can be brought to a position corresponding with the first tubular 110A and moved from an open configuration, in which the first tubular 110A can be moved into and out of the tubular storage area 118, to a closed configuration, in which first tubular 110A is maintained (or secured) in the tubular storage area 118.

In certain instances, the position of the latch system 120 corresponding with the first tubular 110A is disposed between a central axis of the first tubular 110A and the opening 134 of the tubular storage area 118. For example, in an embodiment, the latch system 120 includes an elongated member 122 and a lever 124. The lever 124 can be coupled to the elongated member 122 and move relative thereto. The lever 124, or a portion thereof, can be moved to a position corresponding with an area between the central axis of the first tubular 110A and the opening 134 of the tubular storage area 118. After moving the latch system 120 to the closed configuration (e.g., rotating the lever 124 as described in greater detail below), the lever 124 can be moved away from the opening 134 of the tubular storage area 118 in a direction generally toward the first tubular 110A. In such a manner, the first tubular 110A can be translated within the tubular storage area 118 toward the non-open end 136 of the tubular storage area 118. In a particular embodiment, the latch system 120 can be adapted to translate the first tubular 110A to a position whereby the first tubular 110A contacts the non-open end 136 of the tubular storage area 118. Successively placed tubulars 110 can contact the previous tubular 110 positioned in the tubular storage area 118.

As illustrated in FIG. 2, the elongated member 122 can include a body extending generally parallel with at least one of the first and second fingers 114 and 116. In a more particular embodiment, the elongated member 122 can extend parallel with at least one of the first and second fingers 114 and 116. In an embodiment, the elongated member can define a width, $W_{EM}$, and a length, $L_{EM}$, wherein $L_{EM}$ is greater than $W_{EM}$. For example, $L_{EM}$ can be at least $1.01\ W_{EM}$, at least $1.1\ W_{EM}$, at least $1.5\ W_{EM}$, at least $2\ W_{EM}$, at least $5\ W_{EM}$, at least $10\ W_{EM}$, or at least $25\ W_{EM}$. In a particular embodiment, $W_{EM}$ is no less than $0.000001\ L_{EM}$.

In an embodiment, the elongated member 122 is disposed at a vertical elevation below at least one of the first and second fingers 114 and 116. In another embodiment, the elongated member 122 is disposed above or at a same vertical elevation as compared to at least one of the first and second fingers 114 and 116.

In an embodiment, at least a portion of the elongated member 122 can be spaced apart from at least one of the first and second fingers 114 and 116. In another embodiment, at least a portion of the elongated member 122 can be spaced apart from both the first and second fingers 114 and 116. In a further embodiment, a majority (e.g., greater than 50%, greater than 60%, greater than 70%, greater than 80%, greater than 90%, or greater than 95%) of the elongated member 122 can be spaced apart from the first and second fingers 114 and 116.

In certain embodiments, the elongated member 122 can be coupled to the fingerboard 108 at opposite longitudinal ends of the elongated member 122. An area of the elongated member 122 disposed between the opposite longitudinal ends of the elongated member 122 can define a travel area 162 in which the lever 124 is translatable. In an embodiment, the lever 124 can be infinitely adjustable along the travel area 162 of the elongated member 122. As used herein, "infinite adjustability" and the like refer to conditions whereby two objects can be positioned relative to one another at a theoretically infinite number of locations. That is, for example, the lever 124 can be moved to and utilized at any location along the elongated member 122 without requiring individual, discrete operational areas (e.g., discrete stop points along the elongated member 122).

In certain embodiments, the elongated member 122 can include an interface adapted to permit translation of the lever 124 along at least a portion of the length of the elongated member 122. In an embodiment, the lever 124 can be adapted to translate along at least $20\%\ L_{EM}$, at least $50\%\ L_{EM}$, at least $75\%\ L_{EM}$, or at least $90\%\ L_{EM}$. In a particular embodiment, the lever 124 can be adapted to translate along the entire, or substantially entire, length of the elongated member 122. In another embodiment, the lever 124 can be adapted to translate along a majority of, such as the entire, travel area defined by the elongated member 122.

Figure 3:
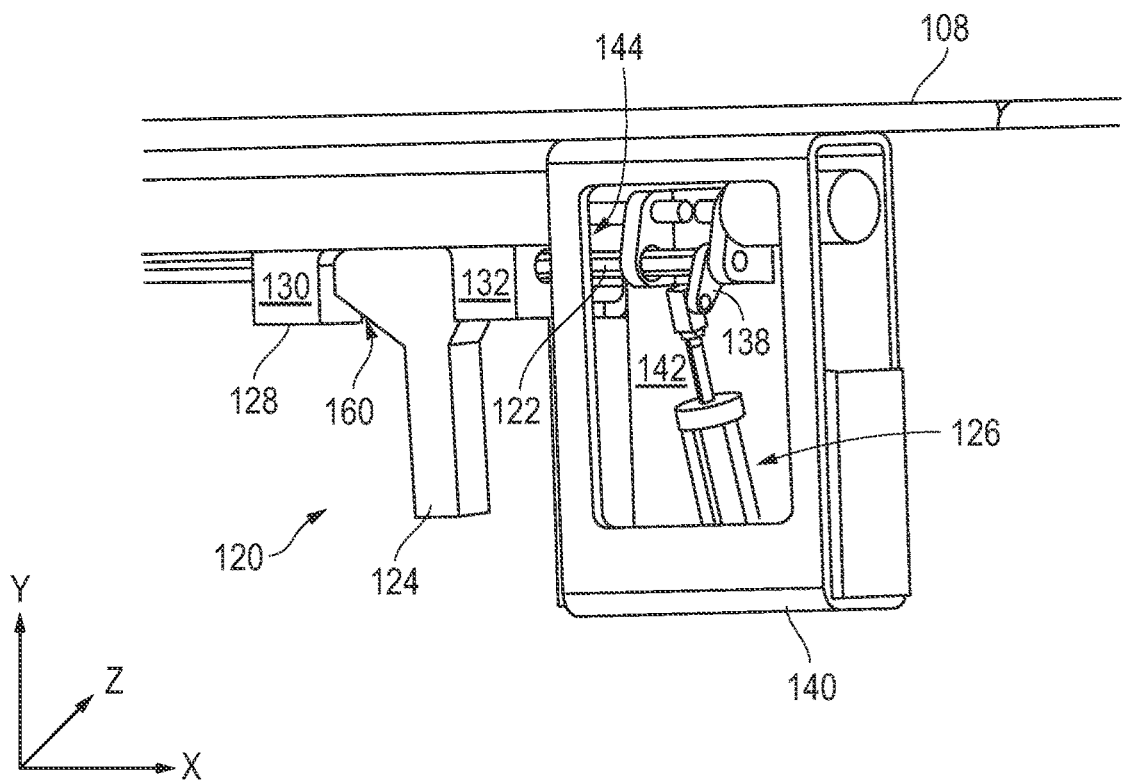
FIG. 3 includes a perspective view of a latch system in accordance with an embodiment in an open configuration.
Figure 4:
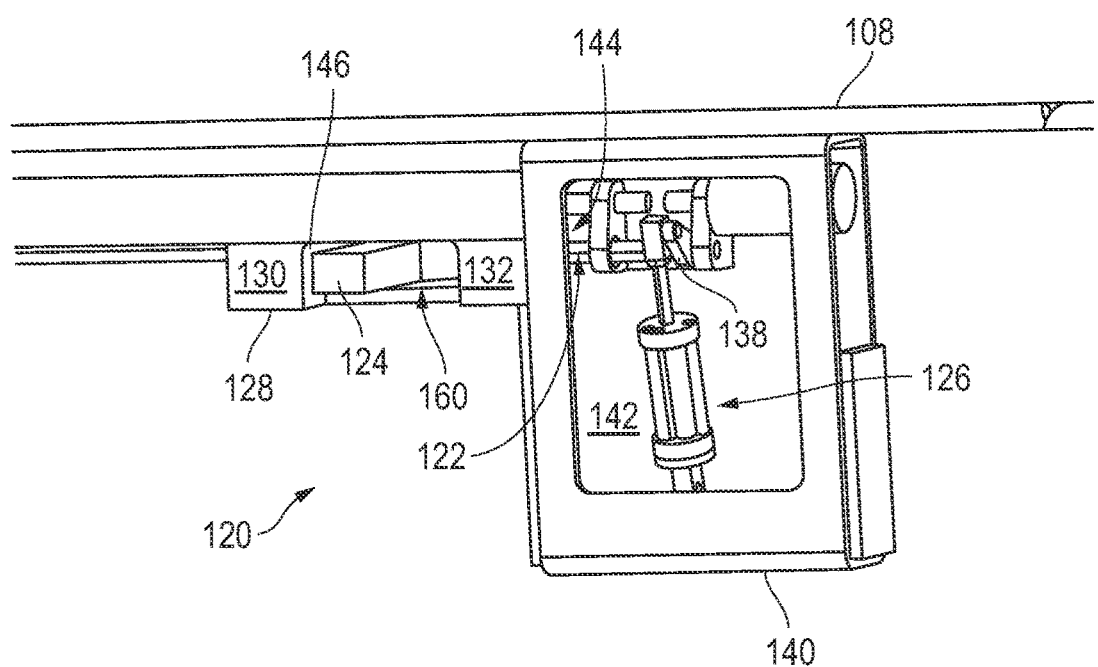
FIG. 4 includes a perspective view of a latch system in accordance with an embodiment in a closed configuration.

Referring to FIGS. 3 and 4, in an embodiment, the lever 124 can be adapted to pivot or rotate on a pivot axis. For example, in an embodiment, the lever 124 is adapted to pivot about a pivot axis generally parallel with the length of the elongated member 122. In yet a more particular embodiment, the lever 124 is adapted to pivot about a pivot axis coaxial with a length of the elongated member 122. In certain embodiments, the lever 124 is adapted to pivot at least 10° about its pivot axis, at least 45° about its pivot axis, at least 90° about its pivot axis, or at least 120° about its pivot axis. In further embodiments, the lever 124 is adapted to pivot less than 360° about its pivot axis, less than 270° about its pivot axis, or less than 180° about its pivot axis. In a particular embodiment, the lever 124 is adapted to pivot approximately 90° between the open and closed configurations.

In an embodiment, the lever 124 can extend along a transverse axis to the plane in which the fingerboard 108 resides when in the open configuration (FIG. 3). In a more particular embodiment, the lever 124 can extend along, or generally along, the Y-axis when in the open configuration. In yet a more particular embodiment, the lever 124 can extend vertically downward along the Y-axis when in the open configuration. It is noted that while the lever 124 may be considered fully open when parallel with the Y-axis, the latch system 120 can be in the open configuration when the lever 124 is in an orientation permitting passage of tubulars 110 into the tubular storage area 118. To move the latch system 120 to the closed configuration, the lever 124 can pivot from the Y-axis to the X-Z plane, or a plane generally parallel therewith. As noted above, the lever 124 may be considered fully closed when the lever 124 is in an orientation restricting passage of tubulars 110 into or out of the tubular storage area 118.

In an embodiment, the angular displacement of the lever 124, as measured between the open and closed configurations, can be at least 1°, at least 5°, at least 10°, at least 20°, at least 45°, or at least 60°. In another embodiment, the angular displacement of the lever 124, as measured between the open and closed configurations, can be no greater than 180°, or no greater than 90°.

In an embodiment, the lever 124 can be rotatably biased by a biasing element 126 including, for example, one or more motors, actuators, or a combination thereof. In a particular embodiment, the lever 124 can be rotatably biased by the elongated member 122 which can be rotatably biased by the biasing element 126. For example, the lever 124 can be coupled to the elongated member 122 in a manner such that the lever 124 is rotatably locked or lockable with respect to the elongated member 122. Thus, the lever 124 can rotate as the elongated member 122 is rotatably biased by biasing element 126. In another embodiment, the lever 124 can be directly biased in a rotational direction by the biasing element 126.

In an embodiment, the biasing element 126 is spaced apart from the lever 124. In another embodiment, the biasing element 126 is adapted to remain at a fixed location while the lever 124 translates relative to, such as along, the elongated member 122. For example, the biasing element 126 can be statically coupled to the fingerboard 108 while the lever 124 is adapted to translate along a line parallel with the elongated member 122.

In a particular embodiment, the biasing element 126 is coupled to the elongated member 122 via a lever 138. The lever 138 can be fixedly coupled with the elongated element 126. In certain instances, the lever 138 is adapted to permit greater torque loading on the elongated member 122 to assist in moving the lever 124 between the open and closed configurations previously described.

In an embodiment, the biasing element 126 is coupled between the elongated member 122 and a support structure 140. The support structure 140 can be coupled with the fingerboard 108. In an embodiment, the biasing element 126 is disposed at least partially within a volume 142 defined by the support structure 140. In a more particular embodiment, the biasing element 126 is disposed entirely within the volume 142 of the support structure 140. Internal placement of the biasing element 126 within the volume 142 can protect the biasing element 126 from impact or damage resulting from falling tubulars, drilling rig equipment, and environmental debris.

In an embodiment, the volume 142 of the support structure 140 can be closed, such that the volume 142 is disconnected from the external environment. In another embodiment, the volume 142 can be at least partially open such that it is in fluid communication with the external environment. Open communication with the external environment may facilitate easier operator access to the biasing element 126 for repairs and diagnostics.

The elongated member 122 can extend into the volume 142 of the support structure 140. For example, in an embodiment, the elongated member 122 can extend through an aperture 144 of the support structure 140. The elongated member 122 can further be supported at least in part by the support structure 140. For example, a bearing or other rotatable element can be disposed between the elongated member 122 and the support structure 140.

Figure 5:
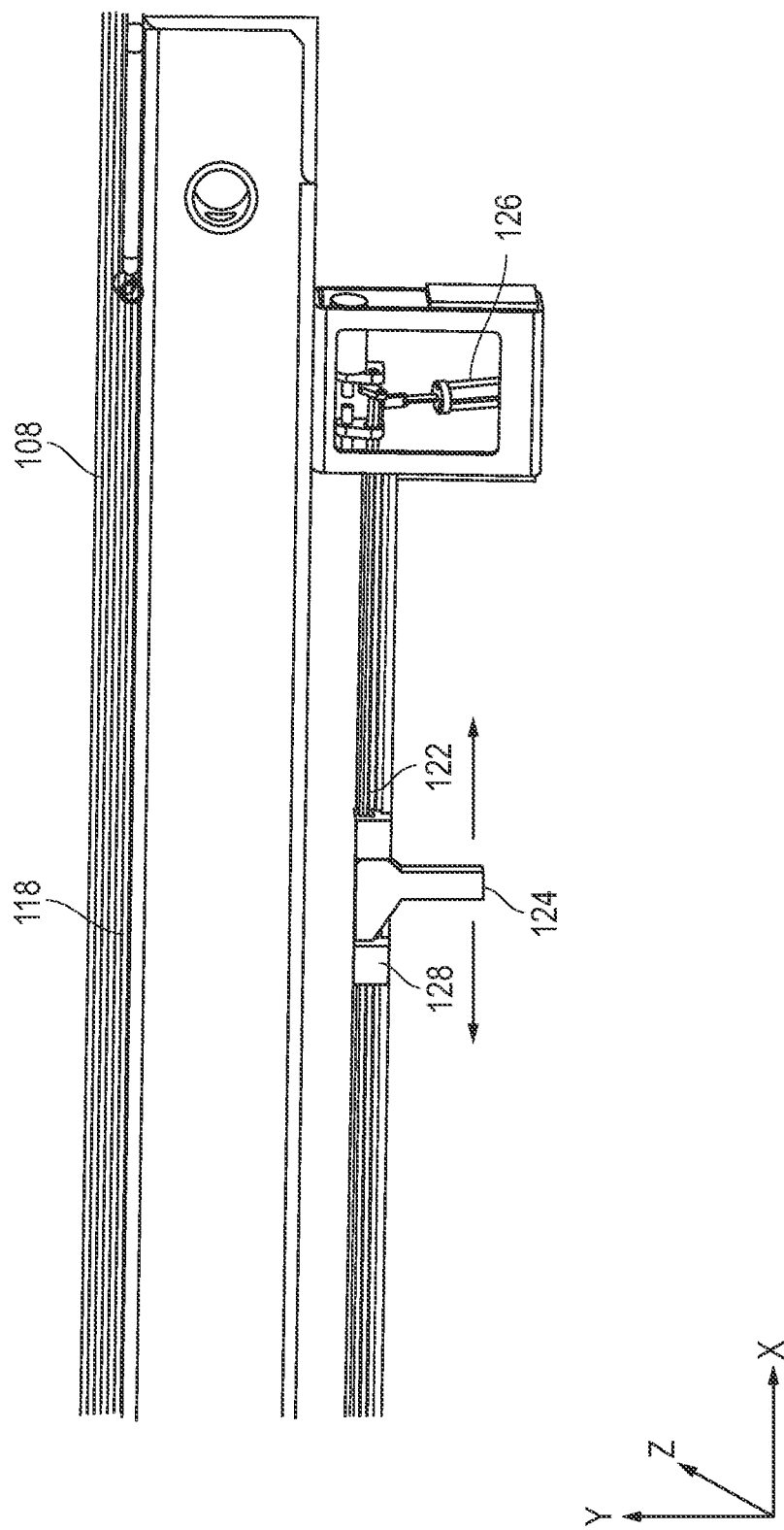
FIG. 5 includes a perspective view of a latch system in accordance with an embodiment where a lever of the latch system is translated along an elongated member of the latch system.

Referring to FIG. 5, in certain embodiments, the lever 124 can be translated relative to the elongated member 122, for example by a biasing element (not illustrated) separate from the biasing element 126. In other embodiments, the lever 124 can be translated relative to the elongated member 122 using the biasing element 126. As the lever 124 translates along the elongated member 122 it can bias tubulars 110 away from the opening 134 (FIG. 2) and secure the tubulars 110 within the tubular storage area 118.

In an embodiment, the lever 124 can be self-locking. In such a manner, the lever 124 can remain securely locked in the closed configuration to prevent accidental failure during operation. For example, in an embodiment, the lever 124 can have an angled surface (not illustrated) on the side of the lever 124 adapted to contact the tubular 110. The angled surface can slope toward the tubulars such that angled surface prevents the lever 124 from rotating past the tubulars to the open configuration.

Referring to FIGS. 3 and 4, in a particular instance, the latch system 120 can include a carrier 128 adapted to translate the lever 124 along the elongated member 122. In the illustrated embodiment, the carrier 128 includes first and second end elements 130 and 132 disposed on opposite sides of the lever 124. The first and second end elements 130 and 132 can be spaced apart by a middle portion 146. The carrier 128, or at least the first and second end elements 130 and 132, can be adapted to translate along the elongated member 122.

In an embodiment, the carrier 128 includes one or more openings through which the elongated member 122 extends through. In a particular embodiment, the first and second end elements 130 and 132 can each include an opening through which the elongated member 122 extends through. The lever 124 can be disposed in a receiving area 160 disposed between the first and second end elements 130 and 132. In an embodiment, the lever 124 can include an opening through which the elongated member 122 extends through. In another embodiment, the carrier 128 can be disposed between the lever 124 and the elongated member 122.

As the carrier 128 translates along the elongated member 122 the lever 124 can be biased therewith. Thus, the lever 124 is moved as the carrier 128 is biased along the elongated member 122. Biasing of the carrier 128 can occur, for example, through the use of a biasing element (not illustrated) coupled with the carrier 128. The biasing element can include a motor, an actuator, or a combination thereof. In an embodiment, the biasing element is spaced apart from the carrier 128. In another embodiment, the biasing element is adjacent to, such as coupled directly with, the carrier 128.

After the first tubular 110A is positioned in the tubular storage area 118 and the latch system 120 is in the closed configuration, the lever 124 can be translated in a direction away from the opening 134 of the tubular storage area 118. The lever 124 can continue translating until the first tubular 110A contacts the non-open end 136 of the tubular storage area 118 or another tubular 110 already disposed in the tubular storage area 118. After contact, the latch system 120 can maintain the first tubular 110A within the fingerboard 108.

In a particular embodiment, the latch system 120 can be adapted to provide a biasing force against the first tubular 110A even after the first tubular 110A is statically positioned within the tubular storage area 118. This additional biasing force can be referred to as a securing force. For example, the lever 124 can be biased in a direction toward the first tubular 110A. In an embodiment, securing force can be generated through the use of a motor, hydraulic, brake, wedge, spring or other tension or compression storage device, or any combination thereof. The use of securing force against the first tubular 110A can preload the system and assist in preventing tubulars from falling out of the fingerboard 108. This can be particularly helpful in extreme environments subject to high wind, waves, or seismic activity where sudden force on the tubulars is to be expected.

In an embodiment, the securing force can be at least 1 $N/m^2$, at least 2 $N/m^2$, at least 3 $N/m^2$, at least 4 $N/m^2$, at least 5 $N/m^2$, at least 10 $N/m^2$, or at least 25 $N/m^2$. In another embodiment, the securing force can be no greater than 10000 $N/m^2$, no greater than 1000 $N/m^2$, no greater than 100 $N/m^2$, or no greater than 50 $N/m^2$. As noted above, the securing force can be active (e.g., motor or actuator) or passive (e.g., brake).

In certain embodiments, the securing force exhibited by the latch system 120 on the first tubular 110A can remain constant over time. In a more particular embodiment, the securing force of the latch system 120 on the first tubular 110A can be predetermined and fixed. In another embodiment, the securing force exhibited by the latch system 120 on the first tubular 110A can be adjustable, thus permitting, for example, an operator or autonomous system to adjust the securing force of the latch system 120 in response to extreme environmental conditions. Adjustment of securing force can also permit the latch system 120 to provide sufficient biasing force when the number of tubulars 110 in the tubular storage area 118 changes. Thus, for example, the securing force exhibited by the latch system 120 can be increased when a greater number of tubulars 110 are disposed within the tubular storage area 118.

In an embodiment, the tubular storage area 118 is adapted to receive a number, $N_T$, of tubulars 110 greater than a number, $N_L$, of levers 124 in the tubular storage area 118. For example, $N_T$ can be at least $N_L+1$, or at least $N_L+2$, or at least $N_L+3$, or at least $N_L+4$, or at least $N_L+5$, or at least $N_L+10$. In a particular embodiment, $N_L$ can equal 1.

Referring to FIGS. 1 to 5, after the first tubular 110A is positioned within the tubular storage area 118, it may be desirable to position a second tubular 110B in the tubular storage area 118. To add the second tubular 110B to the tubular storage area 118, the second tubular 110B can be positioned in the tubular storage area 118 or at a location adjacent to the opening 134 of the tubular storage area 118. The latch system 120 can be reconfigured from the closed configuration (previously used to maintain the first tubular 110A in the tubular storage area 118) to the open configuration. The latch system 120 can be moved to a position corresponding with the second tubular 110B and reconfigured again to the closed configuration. The latch system 120, or a portion thereof, can then translate in a direction away from the opening 134 toward the first tubular 110A. After contacting the first tubular 110A, the second tubular 110B can be statically maintained at a fixed location by the latch system 120 as described above.

In an embodiment, the second tubular 110B is stored between the first tubular 110A and the lever 124 of the latch system 120. Successive tubulars 110 placed in the tubular storage area 118 can be disposed adjacent to one another in a first-in, last-out arrangement.

In an embodiment, the latch system 120 can index a characteristic of tubulars 110 disposed in the tubular storage area 118. The characteristic can be selected, for example, from a number of tubulars 110 disposed within the tubular storage area 118, a location of tubulars 110 within the tubular storage area, a dimension such as diameter of the tubulars 110 in the tubular storage area 118, an angular position of the tubulars 110 disposed within the tubular storage area 118, or any combination thereof.

The latch system 120 can include or be in communication with a microprocessor adapted to receive and analyze information regarding the characteristic of the tubulars 110 in the tubular storage area 118. The information can be displayed to an operator, stored in memory, actively utilized to monitor or adjust a characteristic of the tubulars 110 within the tubular storage area 118, or any combination thereof.

In an embodiment, the fingerboard 108 can further define a second tubular storage area 148 disposed between a third finger 150 and a fourth finger 152 of the fingerboard 108. The second tubular storage area 148 can have any one or more of the characteristics or features as previously described with respect to the tubular storage area 118. For example, the second tubular storage area 148 can have a width less than 200% the diameter of the tubular 110 to be received in the second tubular storage area 148, less than 150% the diameter of the tubular 110 to be received in the second tubular storage area 148, or less than 125% the diameter of the tubular 110 to be received in the second tubular storage area 148.

A second latch system 154 can be utilized with the second tubular storage area 148 in a manner similar to the latch system 120 for tubular storage area 118. For example, in an embodiment, the second latch system 154 can include an elongated member (not illustrated) and a lever (not illustrated). The lever of the second latch system 154 can translate along the elongated member, pivot relative thereto, or a combination thereof.

In an embodiment, the latch system 120 and second latch system 154 are independently operable. That is, the latch systems 120 and 154 can be operated without requiring operation of the other. In an embodiment, the latch system 120 and second latch system 154 can be in communication with a logic element, such as a microprocessor, adapted to control operational position of the latch system 120 and second latch system 154.

One or more sensors (not illustrated) can be in communication with the logic element to provide the logic element with information regarding the position or location of tubulars 110 within the tubular storage area 118 or second tubular storage area 148. In an embodiment, the one or more sensors can be selected from a visual sensor, an auditory sensor, a tactile sensor, or any combination thereof. The sensors can be disposed on the fingerboard 108, the latch systems 120 or 154, the mast 104 or rigging of the drilling rig 100, or any combination thereof.

Figure 6:
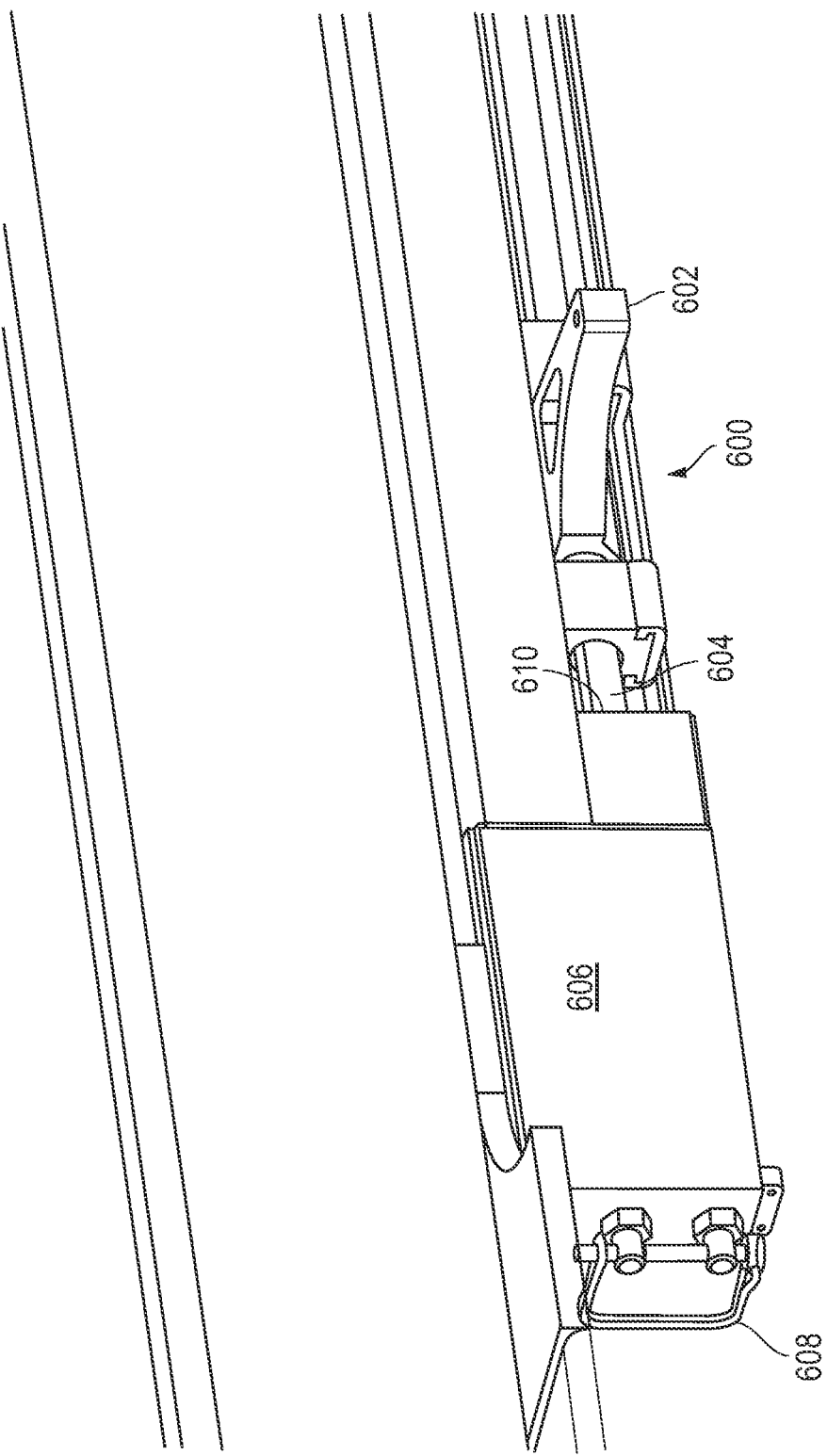
FIG. 6 includes a perspective view of a latch system in accordance with an embodiment.

Referring now to FIG. 6, in an embodiment a latch system 600 can include a lever 602 coupled with an elongated member 604. The lever 602 can be biased in a rotational direction, a longitudinal direction, or a combination thereof by an actuator (not illustrated). The actuator can be disposed inside a housing 606. The housing 606 can include a handle 608 or gripping element to permit an operator to grasp the housing 606. In such a manner, an operator can manipulate, detach or attach, inspect, install, or otherwise operate on the latch system 600. In the illustrated embodiment, the handle 608 can be dynamically coupled to the housing 606. For example, in a particular embodiment, the handle 608 can be rotatable to permit storage thereof and prevent accidental contact therewith, for example with a tubular. In the illustrated embodiment, the housing 606 is disposed adjacent to a longitudinal end 610 of the elongated member 604. In another embodiment, the housing 606 can be disposed at an area between the longitudinal end 610 of the elongated member 604 and an opposite longitudinal end (not illustrated) of the elongated member 604.

It is noted that latch systems in accordance with embodiments described herein can be integrally built into fingerboards or retrofit into existing fingerboards. In an embodiment, the latch system can be self-contained. Self-contained latch systems can be simply retrofit into existing fingerboards by attaching the latch system to the fingerboard and connecting any electronic components of the latch system to existing or retrofit controllers on the drilling rig. For example, in embodiments where sensors and logic elements are already coupled to the latch system, only physical coupling with the fingerboard is required. In embodiments where additional sensors or elements are required, those additional sensors or elements can be rigged into the existing fingerboard along with the latch system.

Use of a self-contained latch system can further permit easier maintenance and diagnostics as existing, integrated methods for preventing tubulars from falling out of fingerboards generally require complete fingerboard overhaul for maintenance and diagnostics. Moreover, the use of fewer levers than tubulars reduces the number of moving parts and actuators required as compared to existing, integrated methods, reducing the risk of mechanical failure during use.

The present invention has broad applicability and can provide many benefits as described and shown in the examples above. The embodiments will vary greatly depending upon the specific application, and not every embodiment will provide all of the benefits and meet all of the objectives that are achievable by the invention. Note that not all of the activities described above in the general description or the examples are required, that a portion of a specific activity may not be required, and that one or more further activities may be performed in addition to those described. Still further, the order in which activities are listed are not necessarily the order in which they are performed.

Embodiments of the present invention are described generally herein in relation to drilling directional wells or unconventional wells, but it should be understood, however, that the methods and the apparatuses described may be equally applicable to other drilling environments. Further, while the descriptions and figures herein show a land-based drilling rig, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

EMBODIMENTS

Embodiment 1. A device for subterranean operations comprising:
a latch system adapted to be coupled with a rack of a drilling rig, the rack including at least two fingers, wherein:
the latch system is selectively moveable between an open configuration and a closed configuration,
the latch system is adapted to selectively permit entrance of a first tubular into a tubular storage area between the at least two fingers when the latch system is in the open configuration, and selectively maintain the first tubular in the tubular storage area when the latch system is in the closed configuration, and
at least a majority of the latch system is spaced apart from the rack.

Embodiment 2. The fingerboard of embodiment 1, wherein the tubular storage area is adapted to receive a number, $N_T$, of tubulars greater than a number, $N_L$, of levers in the tubular storage area.

Embodiment 3. The fingerboard of embodiment 2, wherein $N_T$ is at least $N_L+1$, or at least $N_L+2$, or at least $N_L+3$, or at least $N_L+4$, or at least $N_L+5$, or at least $N_L+10$.

Embodiment 4. The fingerboard of embodiment 2, wherein $N_L$ equals 1.

Embodiment 5. The fingerboard of embodiment 1, wherein the latch system comprises:
an elongated member; and
a lever coupled to the elongated member and adapted to translate along a length of the elongated member.

Embodiment 6. The fingerboard of embodiment 5, wherein the elongated member extends generally parallel with at least one of the at least two fingers of the rack.

Embodiment 7. The fingerboard of embodiment 6, wherein at least a portion of the elongated member is spaced apart from the at least two fingers.

Embodiment 8. The fingerboard of embodiment 5, wherein the lever is adapted to pivot about a pivot axis generally parallel with a length of the elongated member.

Embodiment 9. The fingerboard of embodiment 8, wherein the pivot axis is coaxial with the elongated member.

Embodiment 10. The fingerboard of embodiment 5, wherein the lever is adapted to be rotationally biased by a motor, an actuator, or a combination thereof.

Embodiment 11. The fingerboard of embodiment 5, further comprising a biasing element and a support structure, wherein the support structure is coupled to the rack, and wherein the biasing element is coupled between the lever and the support structure.

Embodiment 12. The fingerboard of embodiment 11, wherein the biasing element is adapted to rotatably bias the lever.

Embodiment 13. The fingerboard of embodiment 11, wherein at least a portion of the biasing element is disposed within a volume defined by the support structure.

Embodiment 14. The fingerboard of embodiment 11, wherein the biasing element comprises a hydraulic actuator, a motor, or a combination thereof.

Embodiment 15. The fingerboard of embodiment 5, further comprising a carrier adapted to translate the lever along the elongated member.

Embodiment 16. The fingerboard of embodiment 15, wherein the carrier comprises a first end and second end defining a receiving area therebetween, and wherein the lever is disposed between the first and second ends of the carrier.

Embodiment 17. The fingerboard of embodiment 15, wherein the elongated member extends through at least a portion of the carrier.

Embodiment 18. The fingerboard of embodiment 5, wherein the lever is adapted to pivot as the elongated member rotates.

Embodiment 19. The fingerboard of embodiment 1, further comprising:
a second tubular storage area disposed between a third finger of the rack and a fourth finger of the rack; and
a second latch system adapted to selectively move between an open configuration and a closed configuration to selectively maintain a third tubular in the second tubular storage area.

Embodiment 20. The fingerboard of embodiment 19, wherein the first and second latches are independently operable with respect to one another.

Embodiment 21. The fingerboard of embodiment 1, further comprising a microprocessor adapted to index a number of tubulars in the tubular storage area.

Embodiment 22. The fingerboard of embodiment 1, wherein the at least two fingers comprises a first finger and a second finger, and wherein the first and second fingers are statically coupled together.

Embodiment 23. The fingerboard of embodiment 1, wherein the latch system is disposed at a vertical elevation below the rack.

Embodiment 24. A latch system adapted to be retrofit on an existing fingerboard comprising:
an elongated member adapted to be coupled to an existing fingerboard; and
a lever rotatably and translatably coupled to the elongated member, wherein the lever is adapted to selectively maintain tubulars in a tubular storage area of the fingerboard.

Embodiment 25. The latch system of embodiment 24, wherein the latch system includes only one lever.

Embodiment 26. The latch system of embodiment 24, wherein the latch system is adapted to be coupled to the existing fingerboard such that the elongated member is generally parallel with at least one finger of the fingerboard.

Embodiment 27. The latch system of embodiment 26, wherein the elongated member defines a length no less than a length of the tubular storage area, as measured parallel with at least one of the fingers of the fingerboard.

Embodiment 28. The latch system of embodiment 24, wherein the lever is translatable along a travel area of the elongated member.

Embodiment 29. The latch system of embodiment 24, wherein the elongated member is adapted to be coupled to a finger of the fingerboard, and wherein a majority of the elongated member is adapted to be spaced apart from the finger.

Embodiment 30. The latch system of embodiment 24, wherein the lever is adapted to be biased by a first biasing element to pivot with respect to the elongated member and a second biasing element to translate along the elongated member.

Embodiment 31. A method of securing tubulars on a drilling rig comprising:
- positioning a first tubular in a tubular storage area of a rack, the tubular storage area being disposed between two fingers of the rack and defining an opening;
- moving a latch system from an open configuration, in which the first tubular can move into and out of the tubular storage area, to a closed configuration, in which the first tubular is maintained in the tubular storage area;
- translating a lever of the latch system in a direction away from the opening of the tubular storage area toward the first tubular; and
- with the latch system, maintaining a securing pressure against the first tubular within the tubular storage area.

Embodiment 32. The method of embodiment 31, wherein translating the lever is performed in a direction generally parallel with a length of at least one of the two fingers of the rack.

Embodiment 33. The method of embodiment 31, further comprising:
- positioning a second tubular in the tubular storage area of the rack;
- switching the latch system from the open configuration to the closed configuration; and
- translating the lever in a direction away from the opening of the tubular storage area to secure the first and second tubulars in the tubular storage area.

Embodiment 34. The method of embodiment 33, further comprising switching the latch system from the closed configuration to the open configuration before positioning the second tubular in the storage rack and after securing the first tubular in the tubular storage area.

Embodiment 35. The method of embodiment 33, wherein translating the lever is performed such that the second tubular is disposed between the first tubular and the opening of the tubular storage area.

Embodiment 36. The method of embodiment 31, wherein translating the lever is performed by a motor, an actuator, or a combination thereof.

Embodiment 37. The method of embodiment 31, wherein the tubular storage area further defines a width, as measured between the two fingers, that is less than 200% the diameter of the first tubular.

Embodiment 38. The method of embodiment 31, wherein maintaining the securing pressure against the first tubular is performed with application of a generally constant force.

Embodiment 39. The method of embodiment 31, wherein maintaining the securing pressure against the first tubular is performed by engaging a brake of the latch system, engaging a hydraulic actuator of the latch system, engaging a stopping element of the latch system, or any combination thereof.

Embodiment 40. The method of embodiment 31, wherein positioning the first tubular in the tubular storage area is performed using a gripper.

The invention claimed is:

1. A method of securing tubulars on a drilling rig, the method comprising:
- positioning a first tubular in a tubular storage area of a fingerboard, the tubular storage area being disposed between two fingers of the fingerboard and defining an opening;
- moving a latch system from an open configuration, in which the first tubular can move into and out of the tubular storage area, to a closed configuration, in which the first tubular is maintained in the tubular storage area;
- translating a lever of the latch system along an elongated member in a direction away from the opening of the tubular storage area toward the first tubular, wherein the elongated member is spaced away from the two fingers; and
- with the latch system, maintaining a securing pressure against the first tubular within the tubular storage area.

2. The method of claim 1, wherein translating the lever is performed in a direction generally parallel with a length of at least one of the two fingers of the fingerboard.

3. The method of claim 2, wherein maintaining the securing pressure against the first tubular is performed with application of a generally constant force.

4. The method of claim 2, wherein maintaining the securing pressure against the first tubular is performed by engaging a brake of the latch system, engaging a hydraulic actuator of the latch system, engaging a stopping element of the latch system, or any combination thereof.

5. The method of claim 1, further comprising:
- positioning a second tubular in the tubular storage area of the fingerboard;
- switching the latch system from the open configuration to the closed configuration; and
- translating the lever in a direction away from the opening of the tubular storage area to secure the first tubular and the second tubular in the tubular storage area.

6. The method of claim 5, further comprising switching the latch system from the closed configuration to the open configuration before positioning the second tubular in the fingerboard and after securing the first tubular in the tubular storage area.

7. The method of claim 1, wherein maintaining the securing pressure against the first tubular is performed with application of a generally constant force.

8. The method of claim 1, wherein maintaining the securing pressure against the first tubular is performed by engaging a brake of the latch system, engaging a hydraulic actuator of the latch system, engaging a stopping element of the latch system, or any combination thereof.

9. The method of claim 1, wherein positioning the first tubular in the tubular storage area is performed using a gripper.

10. The method of claim 1, further comprising positioning a number of tubulars in the tubular storage area and indexing the number of tubulars within the tubular storage area.

11. The method of claim 1, further comprising translating the first tubular away from the opening of the tubular storage area by translating the lever along the elongated member, thereby translating the first tubular away from the opening and securing the first tubular in the tubular storage area.

12. The method of claim 11, wherein the elongated member is disposed below one of the two fingers.

13. The method of claim 1, further comprising:
- positioning a second tubular in the tubular storage area of the fingerboard;
- moving the latch system from the open configuration, in which the second tubular can move into and out of the tubular storage area, to the closed configuration, in which the second tubular is maintained in the tubular storage area;

translating the lever of the latch system in the direction away from the opening of the tubular storage area toward the first tubular and the second tubular; and with the latch system, maintaining a securing pressure against the first tubular and the second tubular within the tubular storage area.

14. The method of claim 13, further comprising translating the second tubular away from the opening of the tubular storage area by translating the lever along an elongated member, thereby translating the second tubular away from the opening and securing the first tubular and the second tubular in the tubular storage area.

15. The method of claim 14, wherein the elongated member is disposed below one of the two fingers.

16. The method of claim 14, wherein the lever is rotationally fixed to the elongated member and translatable relative to the elongated member.

17. A method of securing tubulars on a drilling rig, the method comprising:

positioning a first tubular in a tubular storage area of a fingerboard, the tubular storage area being disposed between two fingers of the fingerboard and defining an opening;

moving a latch system from an open configuration, in which the first tubular can move into and out of the tubular storage area, to a closed configuration, in which the first tubular is maintained in the tubular storage area;

translating a lever of the latch system along an elongated member in a direction away from the opening of the tubular storage area toward the first tubular; and with the latch system, maintaining a securing pressure against the first tubular within the tubular storage area, wherein moving the latch system between the open configuration and the closed configuration comprises rotating the elongated member by extending or retracting a biasing element.

18. The method of claim 17, wherein rotating the elongated member rotates the lever between the open configuration and the closed configuration.

19. A method of securing tubulars on a drilling rig, the method comprising:

positioning a first tubular in a tubular storage area of a fingerboard, the tubular storage area being disposed between two fingers of the fingerboard and defining an opening;

moving a latch system from an open configuration, in which the first tubular can move into and out of the tubular storage area, to a closed configuration, in which the first tubular is maintained in the tubular storage area;

translating a lever of the latch system along an elongated member in a direction away from the opening of the tubular storage area toward the first tubular; and with the latch system, maintaining a securing pressure against the first tubular within the tubular storage area, wherein the lever is rotationally fixed to the elongated member and translatable relative to the elongated member.

20. The method of claim 19, further comprising axially translating the lever of the latch system along the elongated member toward or away from the opening.

* * * * *